United States Patent

[11] 3,627,733

[72] Inventors Akira Ioka
Kawasaki-shi;
Tsuneyuki Kato, Tokyo; Yutaka Toyoda,
Kawasaki-shi, all of Japan
[21] Appl. No. 687,974
[22] Filed Dec. 5, 1967
[45] Patented Dec. 14, 1971
[73] Assignee Asahi Kasei Kogyo Kabushiki Kaisha
Osaka, Japan
Original application June 10, 1964, Ser.
No. 374,173, now Patent No. 3,377,323.
Divided and this application Dec. 5, 1967,
Ser. No. 687,974

[54] METHOD FOR PARTICULARIZING THERMOPLASTIC POLYESTERS
6 Claims, No Drawings

[52] U.S. Cl. ..................................... 260/75 T,
241/1, 260/78 S, 260/88.7 B, 260/96 R
[51] Int. Cl. ..................................... C08g 53/03,
C08f 43/03
[50] Field of Search .......................... 260/75 T,
89.5 S; 241/1

[56] References Cited
UNITED STATES PATENTS

| | | | |
|---|---|---|---|
| 2,665,850 | 1/1954 | Wiczer ........................ | 241/23 |
| 2,742,440 | 4/1956 | Stott et al. ................... | 260/2.3 |
| 2,945,840 | 7/1960 | Roberts et al. ............... | 260/75 |
| 3,042,970 | 7/1962 | Terenzi ....................... | 18/47.3 |
| 3,334,070 | 8/1967 | Chezaud....................... | 260/75 |
| 3,377,323 | 4/1968 | Ioka et al. .................... | 260/78 |
| 3,432,483 | 3/1969 | Peoples et al. ................ | 260/87.3 |

FOREIGN PATENTS

| | | | |
|---|---|---|---|
| 942,691 | 11/1963 | Great Britain ............... | 260/78 S |

*Primary Examiner*—Melvin Goldstein
*Attorney*—Waters, Roditi, Schwartz & Nissen ABSTRACT: A method for particulating a thermoplastic polyester which has a solubility parameter in water of at least 10, and which is insoluble in water at the boiling point of water at normal pressure, such as polyethylene terephthalate, said method comprising heating a mass of the polyester in an autoclave solely in the presence of water up to the temperature that is lower than the melting point of the polyester to dissolve said thermoplastic polyester in the water and cooling or spraying through a nozzle the contents of the autoclave to produce a powder of the polyester.

METHOD FOR PARTICULARIZING THERMOPLASTIC POLYESTERS

CROSS-RELATED APPLICATIONS

This application is a division of our earlier application Ser. No. 374,173 filed June 10, 1964 and now issued as U.S. Pat. No. 3,377,323 (Class 260/078).

This invention relates to a method for pulverizing polymers. More particularly, this invention relates to a method for pulverizing polymers without using any organic solvent. produced Plastic powder molding and plastic powder lining have recently been put into extensive use as comparable with general methods for molding and lining of plastics. That is, in the field of molding, such advantages are obtained by the use of powders that the time required for molding can be reduced and foamed plastics usable for cushions and the like can also be produced by the simultaneous use of a foaming agent in plastics, and furthermore, hollow plastic products can be manufactured, as is well known. From the aspect of lining, it is also well-known that plastic powders can be sprayed and fused on the surfaces to be subjected to lining by means of electrostatic painting and the like.

With the increase of the demand for plastic powders, a number of methods for the production thereof have been proposed, but no satisfactory method has been found yet. As examples of the methods for producing powdered polyamide resin which is one of the plastics used extensively, the following can be cited; one method comprises dissolving a polyamide in a methanolic solution of calcium chloride, adding water to said solution to separate powders and filtering said powders to obtain desired products; a further method comprises dissolving polyamide resins in an autoclave at high temperatures using methanol as a solvent, and cooling the resins to separate and filter powders; still another method comprises dissolving a polyamide in a mixture consisting of water, alcohol and dimethylformamide (10:30:60) at high temperatures, and cooling the solution to separate and filter the powders.

In carrying out these methods, various inconveniences and defects take place; for example, in the case of the first methods, calcium chloride tends to mix in the products, and hence it is required to wash the produced resin powders, and in the case of the second and third methods, the recovery of solvents must be effected in carrying out these methods industrially.

An object of this invention is to provide a method for economically producing resin powders having a uniform grain size which are free from impurities.

Another object of this invention is to provide a method for producing resin powders free from the deficiencies in the known methods.

As a result of thorough research, we have discovered that these objects can be favorably accomplished by treating the raw material polymers with water at high temperatures under pressure, and cooling the contents or spraying the same through a nozzle while being heated.

According to the present invention, adhesion of salts such as calcium chloride or organic solvents such as alcohols is overcome. Accordingly, there is no need to wash the obtained powders or to eliminate or recover the solvents therefrom. Also such phenomena as decomposition, coloring of polymers to be treated, and the like, are negligible and the grain size of the product powders is substantially uniform.

The present invention will be further illustrated hereunder.

The polymers adapted to be used in the present invention are all insoluble in water in the range of ordinary temperature to the boiling point of water and have a value of so-called solubility parameter of greater than 10. The value of solubility parameter (hereinafter referred to as S.P. can be obtained in various manners such as by calculation from physical constants of known organic substances or by direct measurement. As typical methods the following can be cited: one is the evaporation energy method obtaining said value by calculating the cohesive energy density; another is the Hildebrand method (J. Hildebrand, R. Scott, "The Solubility of nonelectrolytes"); still another is a method for inferring the value from molecular structure and density (S. A. Small; J, Appl. Chem., Vol. 3, P.71–80; Feb. 1953); and still another is to obtain the value from solubility or swelling. The values of S.P. of typical polymers obtained by Small's method are shown in table 1.

The polymers adapted to be used in the present invention are thermoplastic polyesters such as polyethylene terephthalate, mixtures of said polyesters with nylon-6 or with a copolymer of acrylonitrile methylacrylate (90:10) having a value of S.P.above P.ABOVE 10.

Table 1

S.P. and melting point of polymer

| Polymer | S.P. | Melting Point (°C.) |
|---|---|---|
| Polyethylene | 8.1 | 104 |
| Polystyrene | 9.12 | 230–233 |
| Polymethylmethacrylate | 9.25 | 160 |
| Polyvinyl chloride | 9.6 | 220 |
| Polyester (Tetron) | 10.7 | 230 |
| Polyacrylonitrile | 12.75 | Above 85 |
| Polyamide (6-nylon) | 13.5 | 215 |
| Water | 23.41 | 100 |

In applying these polymers to the present method, polymers having any shape and size such as pellets, fibers and the like may be utilized. When these polymers are charged into an autoclave together with water, and heated with stirring, they are suspended (dissolved) in the water at certain elevated temperatures below the melting points of the respective polymers. When the treating temperature is raised, the rate of suspension (dissolution) of the polymers in the water increases, and hence the time of treatment 52 reduced. However, with an increase in the treating temperature, it is not only necessary to construct the autoclave strongly, but there is also the unfavorable possibility that decomposition and coloring of the polymers may take place. Accordingly, the treating temperature is subjected to restriction. The maximum treating temperature is ordinarily in the vicinity of the melting point of the respective polymers. Generally, the treating time is in the range of 0.5 to 1.5 hours.

The temperature for the polymers to commence to suspend (dissolve) in water in the present invention varies slightly, depending on the kind of polymer. For example, it is about 170° C. for polyesters.

In this manner, polymers suspended (dissolved) in water are filtered and dried, if desired, after being cooled, or sprayed from the autoclave through a nozzle at high temperature and high pressure. The powders thus obtained have very uniform grain sizes and the majority are in the range between about 1 μ to 10 μ. It may be considered that suspension (dissolution) of the polymers respectively in the present invention has relation to the polar functional groups contained in the polymers. That is, these polymers are crystalline at room temperature, but when heated, the molecular motion thereof gradually becomes more vigorous at a definite temperature, for example, in the vicinity of about 170° C. in the case of polyester, the molecular motion energy approaches the bonding energy between polymer molecules. At this time, solvent molecules penetrate into the thusly loosened polymer structure, and hence it is considered that these polymers swell and suspend (dissolve). At a particular temperature for the respective polymers, these polymers actually suspend (dissolve) in any amount in water, so that the solubilities of the polymers at a certain temperature are not present. In carrying out the present invention, however, it is preferable to limit the ratio of polymer to water to a maximum of 1:1 (by weight) in the case of obtaining powders by discharging the contents through a nozzle while heated. According to the present invention, as illustrated in the foregoing, water is employed as the solvent, and hence it is not required to wash the products and recover any solvents, and also no chemical change occurs in the products. In this manner, it is possible to obtain very economically polymer products having uniform grain size by simple operations. The reason for the use of the term "suspend (dissolve)" in the present specification is that it is impossible to establish whether the polymer is completely dissolved in water under the pressure and temperature employed in the present invention or partially suspended in water without complete dissolution. In any event, it is unquestionable that large particles of polymers can be formed into finely divided powders by applying the present method to the polymers as specified herein. Accordingly, the recitation of a temperature sufficient to suspend (dissolve) said polymer in water implies such a temperature at which finely divided powders can be obtained as a product by treating the large particles of polymer in water and cooling the resulting solution.

In the case of applying the present invention to polymers having a value of S.P. below 10, as shown in the following experimental results, even at temperatures higher than the melting points, suspension (dissolution) of the polymers in water is not obtained. That is, at temperatures higher than the melting points, the polymers dissolve in water but when saturated from the water, and cooled, form a mass. Accordingly, it is utterly impossible to spray the polymers while heated.

experiment 1 Treatment of polyethylene resins

| Polyethylene used: | Polyethylene manufactured by Dow Chemical Co. (U.S.A.) | |
| --- | --- | --- |
| | Melt index, | 20/10 min. |
| | Degree of polymerization, | about 20,000 |

Results:

| Treating temperature | Water | Polyethylene | Treating time | Dissolution (suspension) in water |
| --- | --- | --- | --- | --- |
| 90°–94° C. | 300 g. | 20 g. | 1 hour | No suspension. |
| 100°–104° C. | 300 g. | 20 g. | 1 hour | Molten, but not suspended. |

1. At temperatures below 90°–94° C., no suspension (dissolution) occurs.
2. At temperatures above 100° to 104° C. the polymer melts, but is never dissolved in water, as seen for polyesters and polyamides. It was impossible, therefore, to spray and pulverize them.

Experiment 2 Treatment of polyvinyl chloride resins

| Polyvinyl chloride resin used | Rigid polyvinyl chloride resin. |
| --- | --- |

Results:

| Kind of PVC | Treating Temperature | Water | PVC | Suspension |
| --- | --- | --- | --- | --- |
| Hard | 150° C. | 300 g. | 20 g. | No. |
| | 220° C. | 300 g. | 20 g. | No, degraded |

Polyvinyl chloride resin does not dissolve at 220° C., but the high temperature of 220° C. causes elimination of hydrogen chloride, and degradation takes place in the resin. Therefore, the present process is impossible to be applied to PVC.

The following examples will serve to illustrate the the present invention but are not intended to limit the scope of the invention.

EXAMPLE 1

Three hundred grams of Tetron fiber (polyethylene terephthalate) were charged in an autoclave with 300 g. of water, heated and stirred at 180° C. under pressure of 9.9 kg./cm.$^2$ for 1 hour. Thereafter, the mixture was discharged through a nozzle by the use of compressed air at a pressure of 7 kg./cm.$^2$ and then dried. Resin powders of polyethylene terephthalate having an average grain size of 5 μ were obtained.

EXAMPLE 2

Treatment was carried out in the same manner as in example 1 except by cooling the solution to be treated instead of spraying and drying to obtain a concentrated aqueous suspension of polyester resin powders having a grain size of 1 μ to 10 μ.

EXAMPLE 3

Fifteen grams of nylon-6 (cylindrical shaped pellets; 2 mm. diameter, 2 mm. height) and 15 grams of autocave (polyethylene terephthalate) were charged in an autoclave with 300 g. of water, heated and stirred at 180° C. under pressure of 6.1kg./cm.$^2$ for 1 hour. Thereafter, the mixture was discharged through a nozzle by the use of compressed air at a pressure of 7 kg./cm.$^2$ and then dried to obtain mixed powders of 6-nylon and Tetron having an average grain size of 5 μ.

EXAMPLE 4

Treatment was carried out in the same manner as in example 3 except using 15 g. of Tetron (polyethylene terephthalate) and 15 g. of acrylonitrile-methylacrylate (90:10) copolymer at 180° C. to obtain mixed powders of Tetron and acrylonitrile-methylacrylate copolymer having an average grain size of 5 μ.

We claim:

1. A method for particulating a thermoplastic polyester, said method comprising heating a thermoplastic polyester mass which is insoluble in water at temperatures up to the boiling point of water at normal pressure in an autoclave solely in the presence of water in an amount at least equal in weight to that of said thermoplastic polyester, the thermoplastic polyester having a solubility parameter in water of at least 10, and the temperature in the autoclave being less than the melting point of the thermoplastic polyester to dissolve said thermoplastic polyester in the water, cooling the solution to precipitate the thermoplastic polyester in powder state, and filtering the solution to obtain the thermoplastic polyester in powder state.

2. A method as claimed in claim 1 wherein said thermoplastic polyester is polyethylene terephthalate.

3. A method for particulating a thermoplastic polyester, said method comprising heating a thermoplastic polyester mass which is insoluble in water at temperatures up to the boiling point of water at normal pressure in an autoclave solely in the presence of water in an amount at least equal in weight to that of said thermoplastic polyester the thermoplastic polyester having a solubility parameter in water of at least 10, and the temperature in the autoclave being less than the melting point of the thermoplastic polyester to dissolve said thermoplastic polyester in the water and then spraying the contents of the autoclave under pressure through a nozzle while being heated to obtain the thermoplastic polyester in powder state.

4. A method as claimed in claim 3 wherein said thermoplastic polyester is polyethylene terephthalate.

5. A method for particulating polyethylene terephthalate, said method comprising heating a mass of polyethylene terephthalate which is insoluble in water at temperatures up to the boiling point of water at normal pressure and has a solubility parameter in water of at least 10 in an autoclave solely in the presence of water in an amount at least equal in weight to that of said polyethylene terephthalate, at a temperature of at least 170° C. and less than the melting point of the polyethylene terephthalate to dissolve same in the water, cooling the solution to precipitate the polyethylene terephthalate in powder state, and filtering the solution to obtain the polyethylene terephthalate in powder state.

6. A method for particulating polyethylene terephthalate, said method comprising heating a mass of polyethylene terephthalate which is insoluble in water at temperatures up to the boiling point of water at normal pressure and has a solubility parameter in water of at least 10 in an autoclave solely in the presence of water in an amount at least equal in weight to that of said polyethylene terephthalate, at a temperature of at least 170° C. and less than the melting point of the polyethylene terephthalate to dissolve same in the water, and then spraying the contents of the autoclave under pressure through a nozzle while being heated to obtain the polyethylene terephthalate in powder state.

* * * * *

UNITED STATES PATENT OFFICE
CERTIFICATE OF CORRECTION

Patent No. 3,627,733  Dated December 14, 1971

Inventor(s) Akira Ioka et al

It is certified that error appears in the above-identified patent and that said Letters Patent are hereby corrected as shown below:

On the cover sheet insert:

[32] Priority June 11, 1963

[33] Japan

[31] 38/29,917

Signed and sealed this 12th day of December 1972.

(SEAL)
Attest:

EDWARD M. FLETCHER, JR.
Attesting Officer

ROBERT GOTTSCHALK
Commissioner of Patents